US007319426B2

(12) United States Patent
Garfio

(10) Patent No.: US 7,319,426 B2
(45) Date of Patent: Jan. 15, 2008

(54) CONTROLLING DEVICE WITH ILLUMINATED USER INTERFACE

(75) Inventor: Alejandro Garfio, West Covina, CA (US)

(73) Assignee: Universal Electronics, Cypress, CA (US)

( * ) Notice: Subject to any disclaimer, the term of this patent is extended or adjusted under 35 U.S.C. 154(b) by 315 days.

(21) Appl. No.: 11/153,926

(22) Filed: Jun. 16, 2005

(65) Prior Publication Data

US 2006/0283697 A1 Dec. 21, 2006

(51) Int. Cl.
*H04L 17/02* (2006.01)

(52) U.S. Cl. ........................ 341/176; 341/22; 341/173; 341/174; 341/175; 340/825.49; 345/168; 345/172

(58) Field of Classification Search ................ 341/176, 341/173, 174, 22, 175; 340/825.49; 200/310, 200/311; 385/110, 111; 362/551; 345/168
See application file for complete search history.

(56) References Cited

U.S. PATENT DOCUMENTS

| | | | | |
|---|---|---|---|---|
| 4,623,887 | A | 11/1986 | Welles, II | |
| 4,959,810 | A | 9/1990 | Darbee et al. | |
| 5,097,396 | A * | 3/1992 | Myers | 362/551 |
| 5,226,105 | A | 7/1993 | Myers | |
| 5,255,313 | A | 10/1993 | Darbee | |
| 5,481,256 | A | 1/1996 | Darbee et al. | |
| 5,552,917 | A | 9/1996 | Darbee et al. | |
| 5,568,367 | A | 10/1996 | Park | |
| 5,614,906 | A | 3/1997 | Hayes et al. | |
| 5,743,616 | A | 4/1998 | Giuliano et al. | |
| 5,959,751 | A | 9/1999 | Darbee et al. | |
| 6,014,092 | A | 1/2000 | Darbee et al. | |
| 6,225,938 | B1 | 5/2001 | Hayes et al. | |
| 6,777,884 | B1 | 8/2004 | Barnardo et al. | |
| 2002/0140571 | A1* | 10/2002 | Hayes et al. | 340/825.72 |
| 2003/0025840 | A1 | 2/2003 | Arling | |
| 2003/0103088 | A1 | 6/2003 | Dresti et al. | |
| 2004/0201568 | A1* | 10/2004 | Dowd | 345/156 |
| 2005/0018413 | A1 | 1/2005 | Hoffman | |

* cited by examiner

*Primary Examiner*—Jeffery Hofsass
*Assistant Examiner*—Sisay Yacob
(74) *Attorney, Agent, or Firm*—Greenberg Traurig, LLP

(57) ABSTRACT

An illuminable user interface includes a plurality of input elements, a source of light energy, and a fiber optic filament mat provided with irregularities arranged in one or more controlled patterns to thereby form one or more visible images when the fiber optic filament mat is illuminated by the source of light energy. The one or more visible images are positioned relative to the input elements to convey information concerning the input elements.

46 Claims, 7 Drawing Sheets

SECTION A - A

100

CONTROLLING DEVICE WITH ILLUMINATED USER INTERFACE

BACKGROUND

The following relates generally to controlling devices and, more particularly, to a controlling device having an illuminated user interface. Manufacturers of consumer appliances typically provide a remote control with an appliance, as do providers of subscription broadcasting services. Furthermore, consumers may acquire various forms of after-market controlling devices for the purpose of, for example, extending control range or functionality, consolidating the operations of multiple manufacturer-supplied remote controls into a single unit, replacing lost or broken remotes, etc. In many of these applications, provision of an illuminated, or luminous, user interface on the controlling device may be desirable to facilitate operation in low light conditions, to convey operational status of the controlling device, for aesthetic reasons, etc. Various methods and techniques have been previously proposed for illumination of controlling devices, such as for example those described in U.S. Pat. Nos. 5,568,367 and 6,777,884 or in pending U.S. application Ser. Nos. 10/922,673 and 11/018,008 all of which are incorporated herein by reference in their entirety. As will become apparent hereafter, it is an objective of this invention to provide an alternative and cost-effective method of implementing an illuminated user interface for a controlling device.

Furthermore, to minimize the number of individual remote controls a user requires, universal remote controls have been developed. Accordingly, universal remote controls capable of commanding various functions of multiple types of appliances of various manufacturers have become quite widespread. By way of example, universal remote controls are described in commonly assigned U.S. Pat. Nos. 4,959,810, 5,255,313 and 5,552,917 all of which are incorporated herein by reference in their entirety. For selecting which of multiple appliances a universal remote control is to command, a universal remote control may allow a user to place, i.e., configure or setup, the universal remote control into an operational mode whereby the function keys will be used to transmit commands to a "primary" target appliance that has been associated with that operational mode. For example, a "TV" operational mode may be selected to place the universal remote control into an operational mode whereby function keys are used to transmit commands primarily to a designated television, a "VCR" mode may be selected to place the universal remote control into an operational mode whereby function keys are used to transmit commands primarily to a designated VCR, etc. Accordingly, the ability to indicate current key assignments to a user, as well as the ability to alter the appearance and/or layout of the keypad area, for example to present to the user keys which are applicable to controlling a given appliance, is advantageous in a universal remote control. It is thus a further objective of this invention to provide a cost effective means for implementing a universal remote control with multiple, different user interfaces and/or user interfaces in which color may be used to convey operational status of the controlled or controlling device, key function assignments, etc.

SUMMARY

In accordance with this and other needs, the following generally discloses a controlling device having an illuminable user interface. The illuminable user interface is generally composed of a plurality of input elements, a source of light energy, and a fiber optic filament mat provided with irregularities arranged in one or more controlled patterns to thereby form one or more visible images when the fiber optic filament mat is illuminated by the source of light energy. The one or more visible images are positioned relative to the plurality of input elements to provide information concerning the input elements, such as operational mode information, functions to be controlled upon actuation of input elements, etc.

The various advantages, features, properties and relationships of this improved user interface will be obtained from the following detailed description and accompanying drawings which set forth illustrative embodiments which are indicative of the various ways in which the principles thereof may be employed.

BRIEF DESCRIPTION OF THE DRAWINGS

For use in better understanding the exemplary controlling devices described hereinafter reference may be had to the following drawings in which.

DETAILED DESCRIPTION

Figure 1:
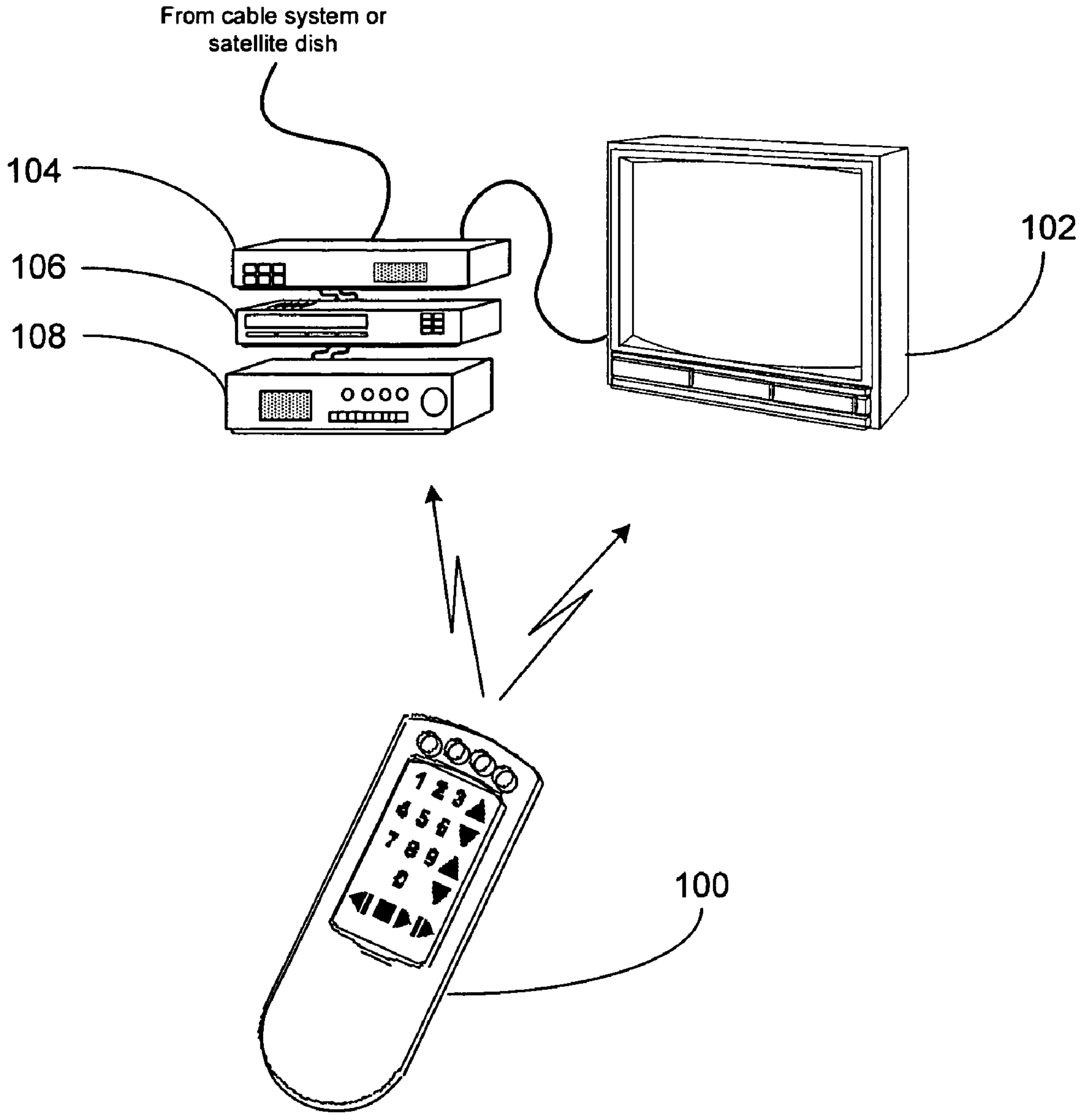
FIG. 1 illustrates an exemplary system in which the exemplary controlling devices may be utilized.

The following discloses a controlling device having a face panel on which is carried a user interface activatable to cause transmission of at least one command to at least one appliance. More particularly, one or more sources of energy are used to cause the user interface to be displayed on the face panel. By way of example, FIG. 1 shows an exemplary system, including controllable appliances, such as a set top box ("STB") 104, a VCR 106, an audio amplifier/receiver 108 and a television 102, as well as a controlling device 100. The controlling device 100 is capable of transmitting commands to the appliances, using any-convenient IR, RF, Point-to-Point, or networked protocol, to cause the appliances to perform operational functions. While illustrated in the context of a STB 104 with VCR 106, audio system 108 and television 102, it is to be understood that controllable appliances can include, but are not limited to, televisions, VCRs, DVRs, DVD players, cable or satellite converter set-top boxes (STBs), amplifiers, CD players, game consoles, home lighting, drapery controls, fans, HVAC systems, thermostats, personal computers, etc., and as such the instant exemplary disclosures are not intended to be limiting as to type or quantity of controllable appliances or equipment.

Figure 2:
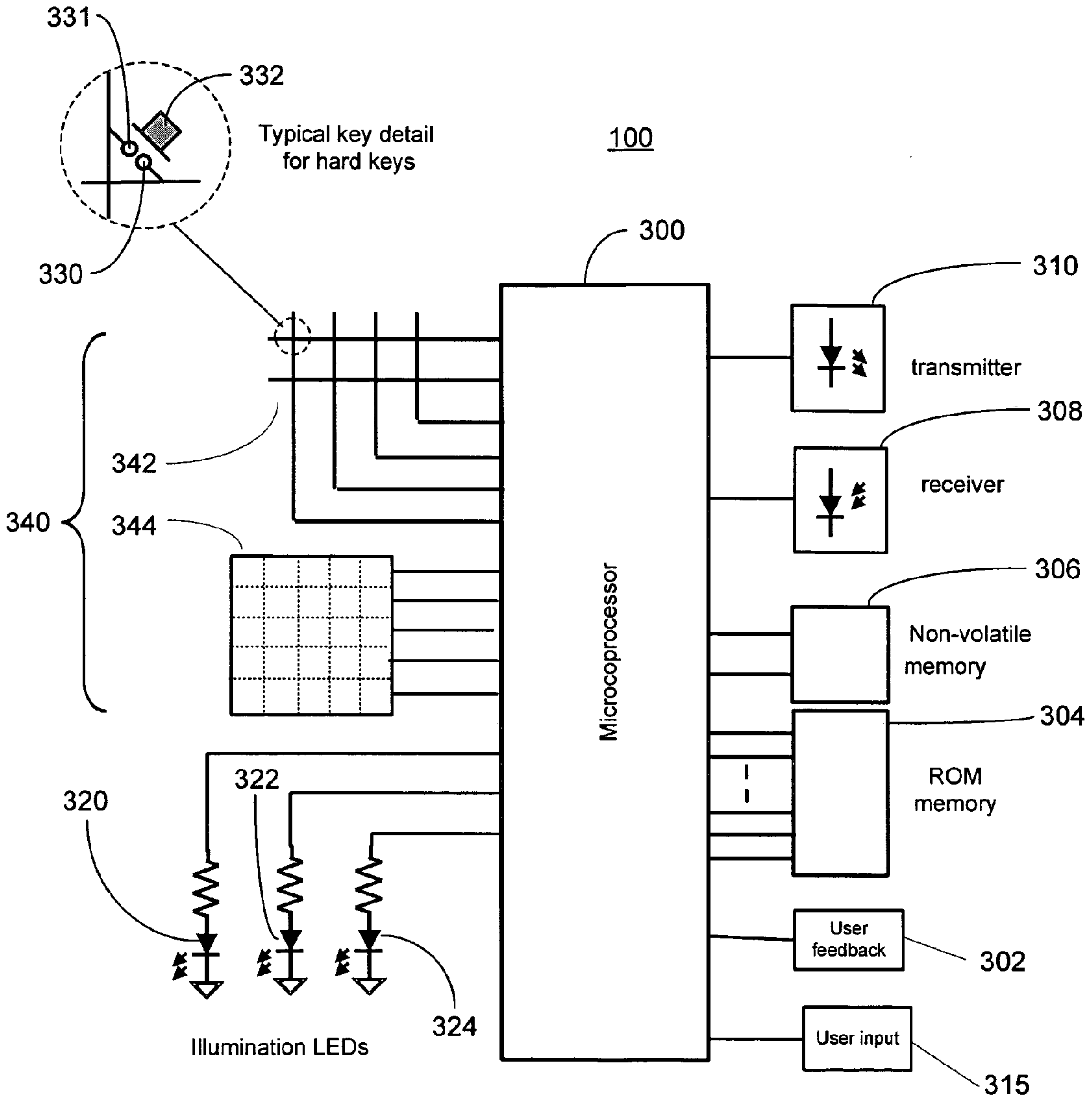
FIG. 2 illustrates a block diagram of exemplary components of the exemplary controlling devices.

For use in commanding the functional operations of one or more appliances, the controlling devices 100 may include, as needed for a particular application, a processor 300 coupled to a ROM memory 304, a key matrix 340 (e.g., soft keys 344 such as a transparent or translucent touch sensitive surface placed over an underlying surface on which is carried a visually discernable representation of key function icons; alone or combined with hard keys 342), transmission circuit(s) 310, receiver circuit(s) 308 and/or transceiver circuit(s) (e.g., IR and/or RF), a non-volatile read/write memory 306, a means 302 to provide feedback to the user (e.g., LED, display, speaker, and/or the like), a means 315 (such as a microphone, etc.) for receiving additional non-keypress input from the user, and means for providing visual and/or audio cues to the user, all as illustrated in FIG. 2.

The means for providing visual and/or audio cues to the user so as to disseminate information to the user may be embodied as key illumination means, a device face illumination means, a sound or voice synthesizer circuit, a vibrator and circuit, and/or a digital recording and playback circuit (for example to allow a user to playback sound or voice tags input via a microphone or otherwise downloaded into the controlling device). The key illumination means may be in the form of separate elements, such as LEDs 320, 322, and 324, either directly associated with a hard key matrix or used for indirect general illumination of an area such as in the case of an internally illuminated display surface or panel as will be described in more detail hereinafter. In the case where the controlling device 100 includes hard keys, which is not required, an exemplary molded-in key 332 is shown as operative with key matrix circuit 330,331.

As will be understood by those skilled in the art, the ROM memory 304 may include executable instructions that are intended to be executed by the processor 300 to control the operation of the remote control 100. In this manner, the processor 300 may be programmed to control the various electronic components within the remote control 100, e.g., to monitor the power supply (not shown), to cause the transmission of signals, control the key illumination means 320, 322, and 324, feedback circuits, device face illumination means, etc. The non-volatile read/write memory 306, for example an EEPROM, battery-backed up RAM, Smart Card, memory stick, or the like, may be provided to store setup data and parameters as necessary. While the memory 304 is illustrated and described as a ROM memory, memory 304 can also be comprised of any type of readable media, such as ROM, RAM, SRAM, FLASH, EEPROM, or the like. Preferably, the memory 304 is non-volatile or battery-backed such that data is not required to be reloaded after battery changes. In addition, the memories 304 and 306 may take the form of a chip, a hard disk, a magnetic disk, and/or an optical disk.

To cause the controlling device 100 to perform an action, the controlling device 100 may be adapted to be responsive to events, such as a sensed user interaction with the key matrix 340, receipt of a transmission via receiver 308, etc. In response to an event, appropriate instructions within the memory 304 may be executed. For example, when a function command key is activated on the controlling device 100, the controlling device 100 may retrieve a command code corresponding to the activated function command key from memory 304 and transmit the command code to an intended target appliance, e.g., STB 104, in a format recognizable by that appliance. It will be appreciated that the instructions within the memory 304 can be used not only to cause the transmission of command codes and/or data to the appliances, but also to perform local operations. While not limiting, local operations that may be performed by the controlling device 100 may include displaying information/data, favorite channel setup, macro key setup, function key relocation, user programming of favorite channel selections, etc. A further, local operation is the ability to "lock" function keys across device operational modes as described in U.S. Published Patent Application No. 2003/002584 (Ser. No. 09/922,562). Examples of still further local operations can be found in U.S. Pat. Nos. 5,481,256, 5,959,751, and 6,014,092.

Figure 3:
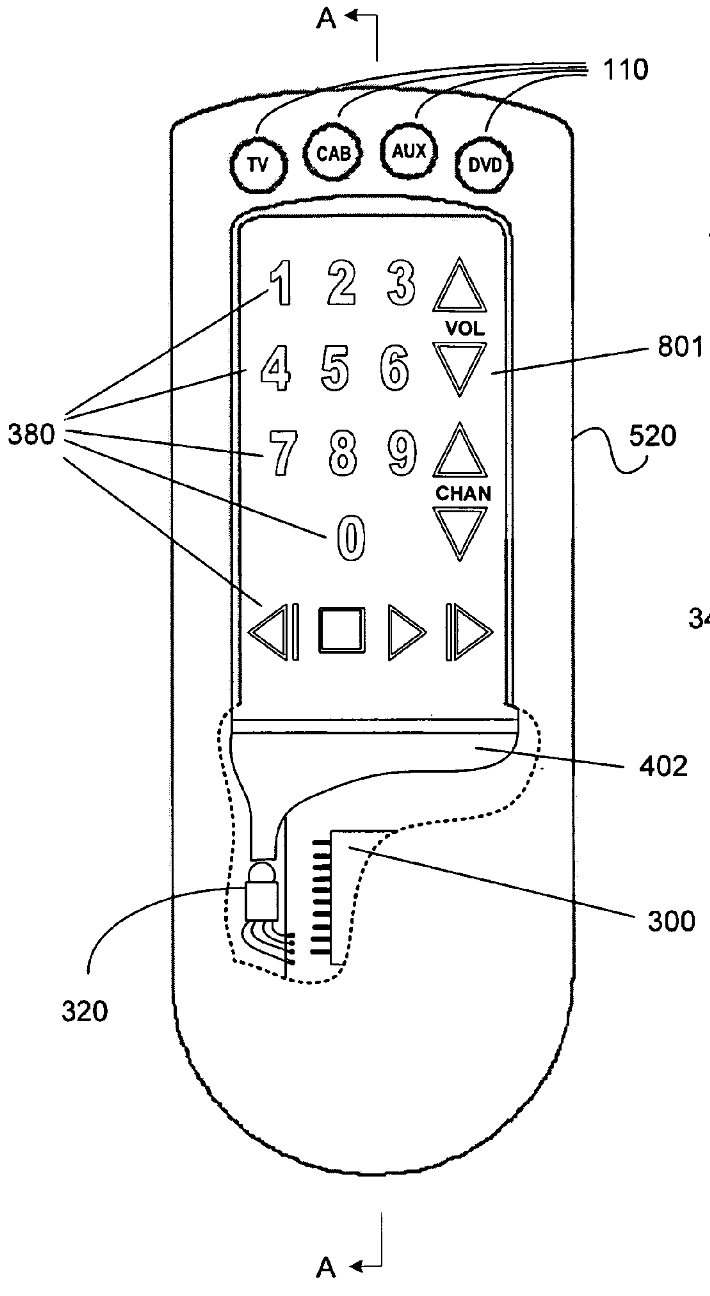
FIG. 3 illustrates the construction of an exemplary controlling device having an internally illuminable user interface.
Figure 3:
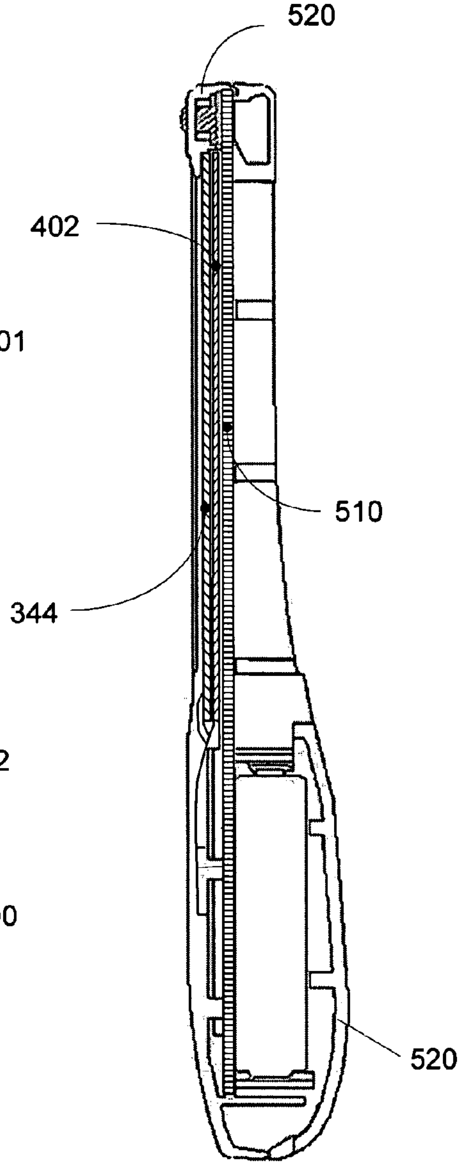

For creating a correspondence between a command code and a function command key, data may be entered into the controlling device 100 that functions to identify an intended target appliances by its type and make (and sometimes model). Such data allows the controlling device 100 to transmit recognizable command codes in the format appropriate for such identified appliances. Typically, intended target appliances are identified for each operational mode of the controlling device 100. By way of example, FIG. 3 illustrates a controlling device 100 having a "TV" operational mode, a "CAB" (cable box) operational mode, an "AUX" operational mode, and a "DVD" operational mode which are selectable through activation of a corresponding device mode selection key 110. Since methods for setting up a controlling device to command the operation of specific home appliances are well-known, such methods need not be described in greater detail herein. Nevertheless, for additional information pertaining to setup procedures, the reader may turn to U.S. Pat. Nos. 4,959,810, 5,614,906, and 6,225,938. It will also be appreciated that a controlling device 100 may be set up to command an appliance 102 by being taught the command codes needed to command such appliance as described in U.S. Pat. No. 4,623,887. Still further, it will be understood that command codes may be pre-stored in the controlling device 100 or the controlling device 100 may be upgradeable, for example via use of receiver 308.

Figure 4:
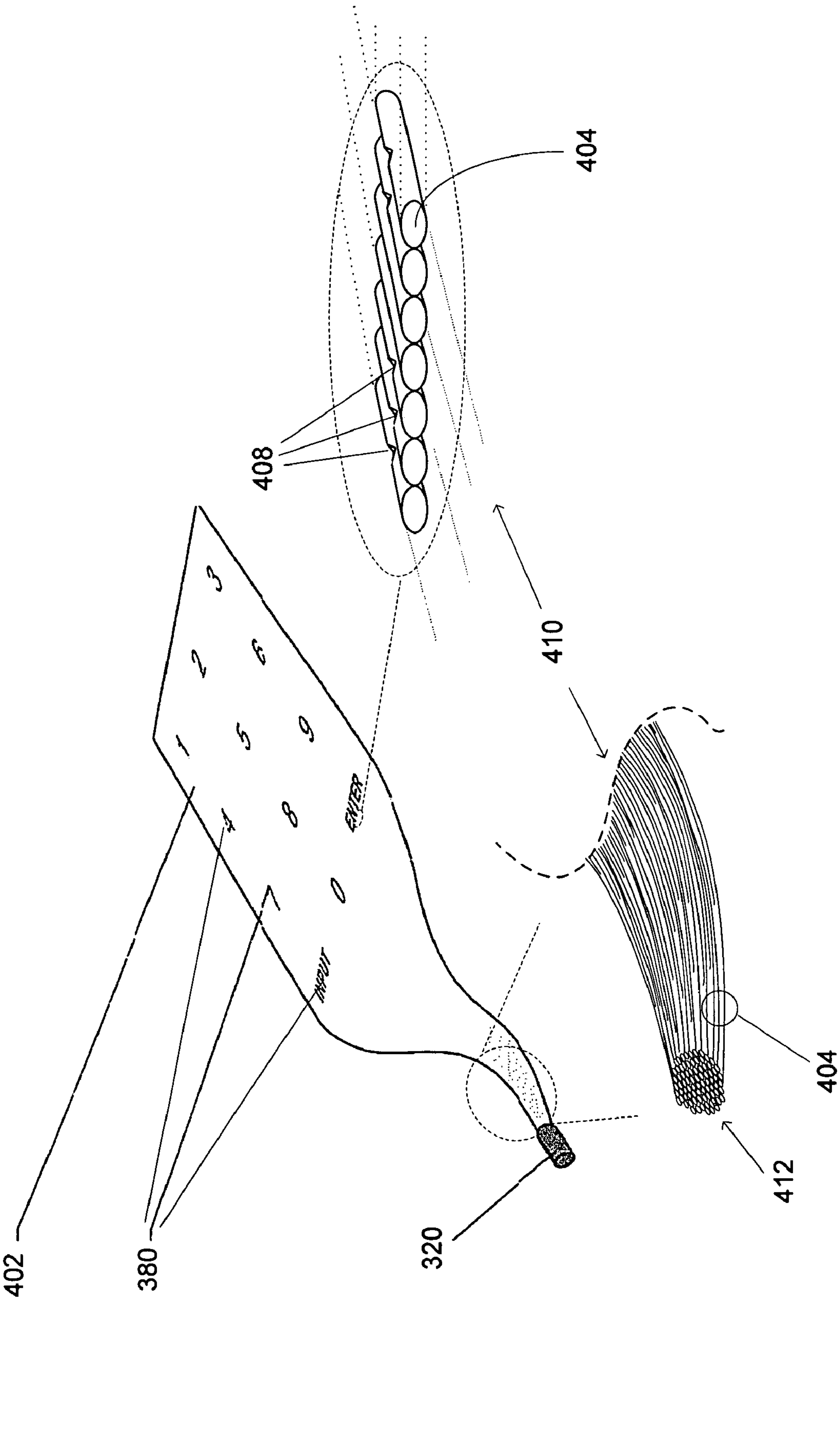
FIG. 4 illustrates the configuration of an exemplary controlling device display surface embodying an internally illuminable user interface in accordance with the teachings of this patent.

More particularly, the exemplary controlling device 100 illustrated in FIG. 3 has a user interface 801 comprising a transparent touch sensitive key matrix surface 344 overlaid on a display 402 made up of a bed of individual light conducting fiber optic strands or filaments which are etched or scored in a controlled manner so as to emit scattered light in the shapes of desired key function icons 380 when illuminated by a LED 320. By way of further illustration, FIG. 4 demonstrates that a display 402 may be comprised of a single layer mat 410 of fiber optic strands or filaments 404. While generally arranged as a single filament thick mat or panel 410, filaments 404 may be gathered together at one end as illustrated at 412 for convenient injection of light energy by light source 320. As is well known in the art, light injected into fiber optic filaments in this manner tends to stay trapped or confined within the filament as a result of the optical phenomenon known as total internal reflection, sometimes referred to as a "light pipe." In this exemplary embodiment illustrative of the instant invention, individual filaments are etched or notched at defined locations 408 to create irregularities in the filament walls such that an aggregation of etches or notches will corresponded to the forms of desired iconic representations of key functions, for example those icons indicated by 380 in the figures. When light traveling through a filament encounters such an irregularity or deformation, the internal wall of the optic fiber no longer acts as a perfect reflector and part of the light will be scattered and visibly escape the confines of the light pipe. In this manner, an illuminated user interface having illuminated iconic representations of key functions may be created using the energy provided by a light energy source such as LED 320.

Figure 5:
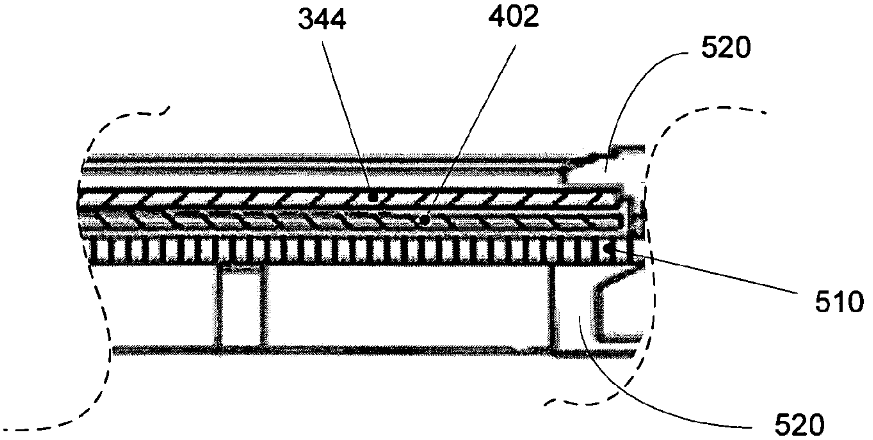
FIGS. 5 and 6 illustrate further details of the construction and configuration of an exemplary controlling device display surface embodying an internally illuminable user interface in accordance with the teachings of this patent.
Figure 6:
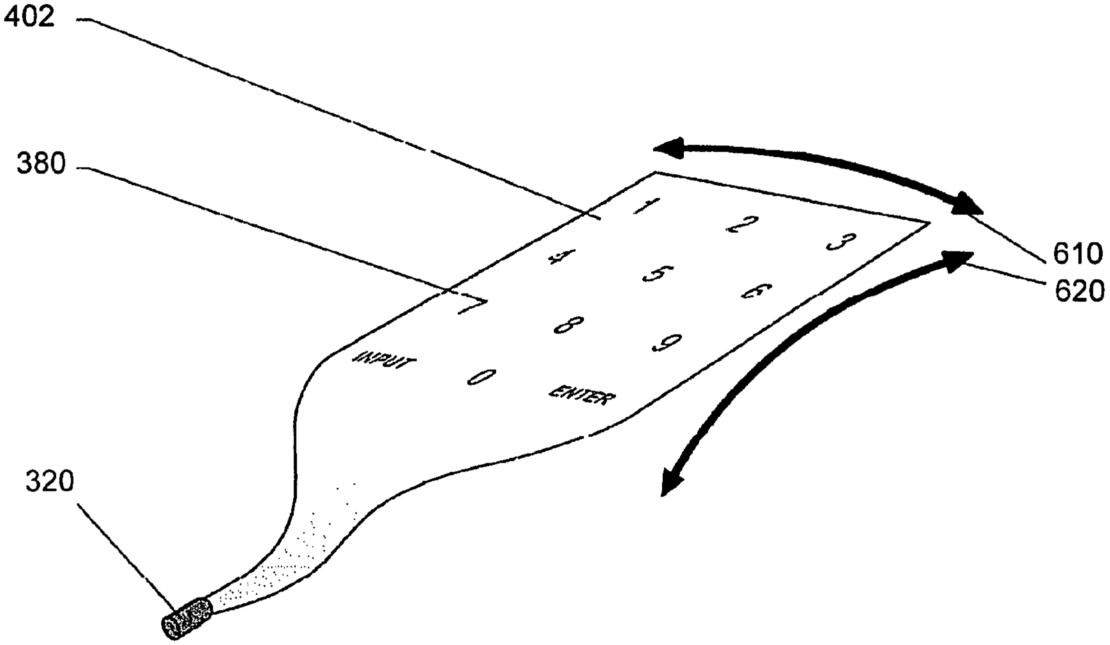

To construct an exemplary illuminated display panel, a mat of fiber optic filaments 402 may be positioned so as to rest on top of a printed circuit board 510 (or similar backing material) with a transparent or translucent touch sensitive surface 344 positioned above the fiber optic elements 402. This combination of elements would preferably be encased at its outer edges and retained in position by a plastic housing 520, as illustrated in FIG. 5. It will however be appreciated that alternative embodiments are possible, for example, instead of a touch sensitive surface being used to sense user input, an additional layer comprising metallic dome switches could be located between fiber optic mat 402 and printed circuit board 510. In this case the outer surface corresponding to 344 in the previous example simply serves as protection for the fiber optic filaments and any appropriate transparent or translucent material may be used. Still further, conventional hard keys may be provided with the illuminated icons being positioned adjacent to or surrounding the hard key components. It will also be appreciated that, as illustrated in FIG. 6, such a mat of fiber optic filaments 402 is flexible in both planar axes 610 and 620 thus permitting considerable design latitude in the surface shape of a controlling device (as opposed, for example, to a glass LCD material).

Figure 7:
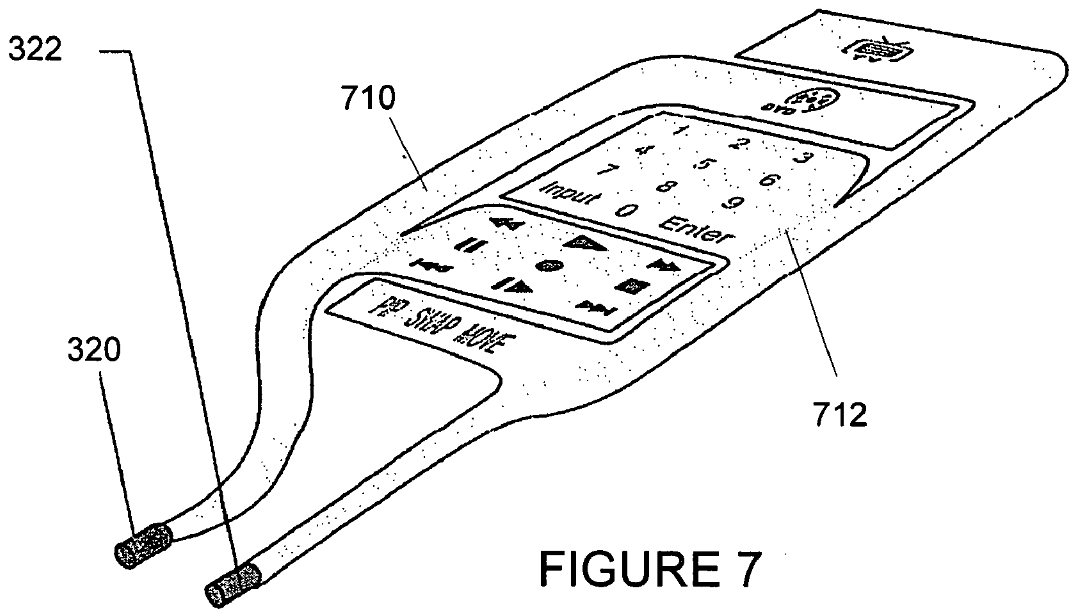
FIG. 7 illustrates a second exemplary configuration of a controlling device display surface embodying a user interface comprising separately illuminable sections.
Figure 8:
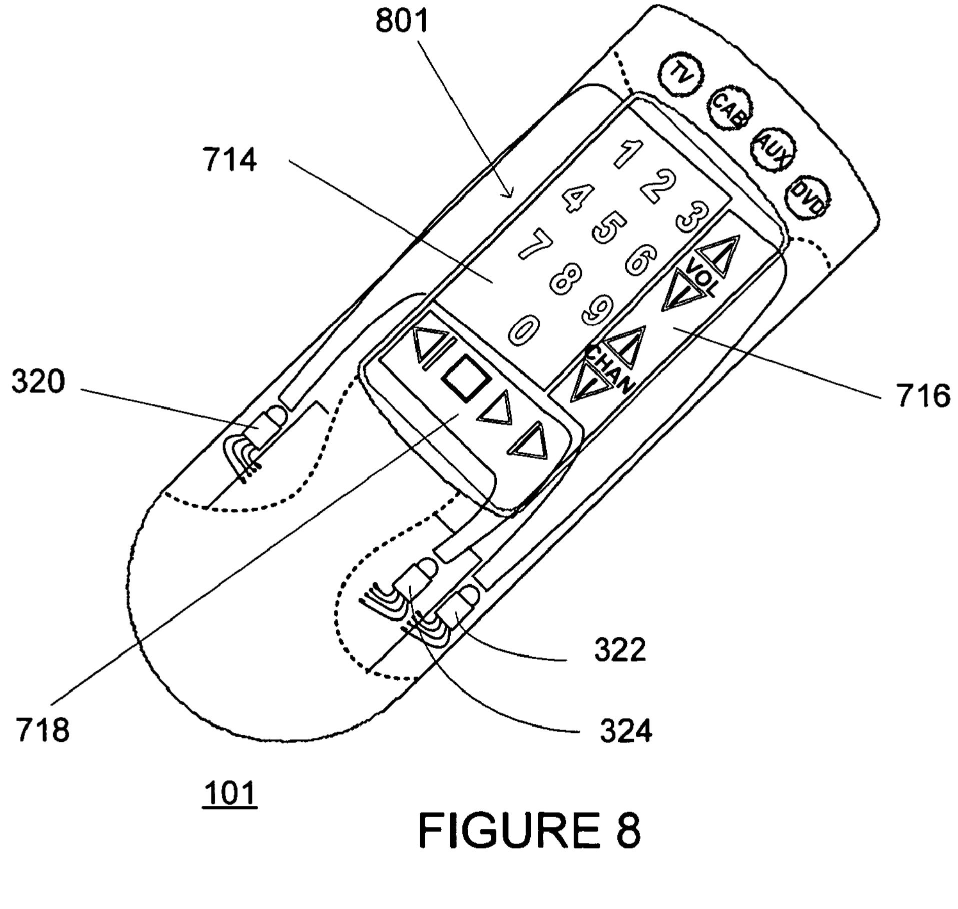
FIG. 8 illustrates an exemplary controlling device having an illuminable user interface including separately illuminable sections of the type illustrated in FIG. 7.

Turning now to FIGS. 7 and 8, in an alternative exemplary embodiment, multiple fiber optic filament mats 710, 712 (FIG. 7) or 714, 716, 718 (FIG. 8) may be utilized in a single controlling device 101. (By way of illustration, one possible icon layout is shown in FIG. 7 and another in FIG. 8.) In these embodiments, multiple illuminating LEDs 320, 322, 324 may be provided to enable selective illumination of a corresponding fiber optic filament mat and, in turn, selective portions of the user interface. It will also be appreciated that in general LEDs 320, 322, 324 may comprise individually colored LEDs or may comprise a multi-color capable component (for example red/green/yellow as is well known in the art). In this manner, all or portions of the entire display face 801 may be illuminated in different colors by energizing different LEDs or groups of LEDs and/or different elements of multi-color LEDs.

Figure 9:
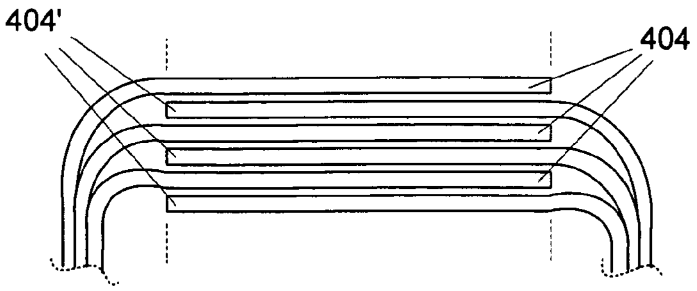
FIG. 9 illustrates a further exemplary configuration of a controlling device display surface embodying a user interface comprising separately illuminable elements.
Figure 10:
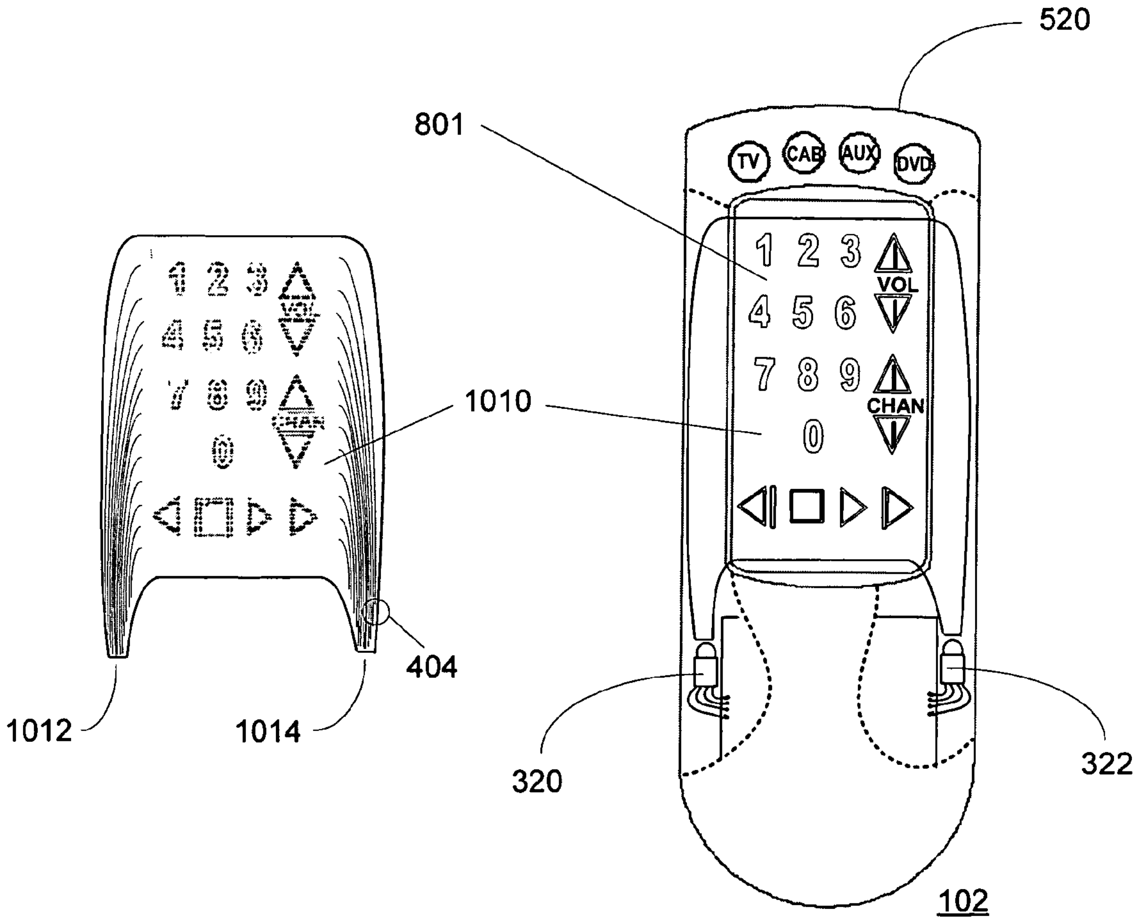
FIG. 10 illustrates a further exemplary configuration of a controlling device display surface embodying a user interface which is illuminable by two separate light sources, together with an exemplary controlling device utilizing such a display surface.

Although illustrated in FIG. 7 in the form of separated areas, it will be appreciated that in alternative embodiments two or more sets of fiber optic filaments 404, 404' may be interwoven as illustrated in FIG. 9 to create independently illuminable segments within the same area, permitting the provision of multiple and/or variable icons at individual key locations. It will also be appreciated that in certain embodiments multiple sources of light energy may be situated at both ends of the optical fiber mat. In such cases, these sources of light energy may be energized separately or simultaneously, for example to provide multiple colors. An exemplary embodiment using this approach is illustrated in FIG. 10, in which a controlling device 102 is provided with a display 1010 formed so as to allow injection of light energy from either end of the fibers forming the mat, i.e., the filaments 404 comprising the mat are gathered together at both ends 1012, 1014. In variations of this embodiment, LEDs 320 and 322 may be single or multi-color LEDs as appropriate. For example, LED 320 may be a red/green combination and LED 322 a blue/white combination, such that energizing the LEDs in various combinations will cause the display face 810 to be illuminated in multiple colors in order to convey status or information to the user of controlling device 102.

Additional methods for selectively illuminating the display face may be possible without departing from the spirit and scope of the current invention, for example, a single color LED (i.e., a white light LED) may be used in conjunction with one or more color filters and/or lenses mechanically operable to cause different illumination colors or hues within the display face. It will also be understood that well known translucent LCD methods may be used to accomplish the various aspects and features contemplated by the current invention, either independently or in conjunction with other display illumination techniques described herein. For example, translucent LCD's effectively mask or filter light passing through portions of the display, and may be used in conjunction with the techniques described herein to present a rich functional environment to a user or users.

Yet further, the function keys and/or function key background may be illuminated a color to indicate to a user a current operational mode of the controlling device 100, e.g., appliance operational mode, user operational mode, room operational mode, etc. For example, the user interface 801 may be illuminated red when the controlling device is currently in one user's operational mode (e.g., the remote control is configured to use the favorites, macros, etc. of that user) and may be illuminated green when the controlling device is placed into another user's operational mode.

As noted, a color indicative of an intended target appliance that is associated with a function key, a user mode, or a room mode may be achieved by illuminating one or more appropriately colored LEDs (or LED elements) that are associated with the function key (e.g., in the case of "hard" keys) or display face (e.g., in the case of "soft" keys). In this instance, a cue (color or sound) that is selected so as to be indicative of an intended target appliance, user operational mode, or room operational mode may be predefined or user-selectable (e.g., a user may select a color or sound from a menu, by stepping through various color or sound choices, by being downloaded and assigned, etc.). Furthermore, the absence of a color and/or sound may also be used to provide information to the user.

In the case where operational modes are to be indicated to the user, such as user operational modes or room operational modes, it will be appreciated that all or part of an entirety of the functions keys or display face may be illuminated as described above to cause an information providing color to be presented to the user.

The ability to independently illuminate (or in the case of a translucent LCD, mask or filter) various parts of the controlling device 100, e.g., the keys and/or display, with different light wavelengths (i.e., light colors) may be used to advantageously provide a user of the controlling device 100 with a visual indication as to which appliance a command should be transmitted to (e.g., the intended target) when a function key is activated. For example, a color association between a function key and an appliance may be used to provide a user with information indicative of which function keys are locked to which appliances across the various "device" modes. Still further, the color association between a function key and an appliance may be used to provide a user with information indicative of which function key is assigned to which appliance when multiple appliances are controllable from a user interface, e.g., when the controlling device 100 is in a "home theater" operational mode.

It should be understood that the foregoing describes various exemplary methods for providing an illuminated or luminous user interface and/or cues to a user of a controlling device. It should also be understood that the methods described and illustrated are provided by way of example only and are not intended to be limiting. For example, the illustrated and described indicia may be of varying widths and sizes and may take the form of single lines, blocks, icons, etc. Indicia also need not be associated with specific individual keys but may alternatively be associated with groups of keys or areas on the face of the remote control by forming boxes, circles, highlight lines, arrows, etc. It will be further appreciated that the patterns of grooves and/or indentations comprising such indicia may be formed on the fiber optic material by cutting, grinding, molding, etching, stamping, embossing, or any other convenient manufacturing process, collectively referred to as "irregularities" of the fiber optic material. It will also be appreciated that while the illustrative embodiment described above utilizes an arrangement of LEDs as the source of light energy to illuminate the indicia, various other sources of light energy, e.g. electroluminescent strips, incandescent bulbs, etc., or even ambient light, may alternatively be used without departing from the spirit of the invention.

It is to be additionally appreciated that the concepts described herein may also be utilized to convey to a user of the controlling device a state of an appliance being operated, which state information may be conveyed within luminous user interfaces using colors, symbols, etc. To this end, state information may be conveyed from an appliance to the controlling device, maintained internally within the controlling device, or be provided to the controlling device from a third appliance responsible for tracking the state of the appliance, such as described in commonly assigned, co-pending patent U.S. patent application Ser. Nos. 10/979,352 and 10/694,582. State information may then be communicated to the user by, for example, causing an image to be illuminated a certain color (e.g., a image representative of a "play" transport command may be illuminated red when the appliance has stopped playing media, be illuminated green when the appliance is playing media, be illuminated yellow when the appliance has paused in the playing of media, not be illuminated when the appliance does not have playable media loaded therein, etc.); causing an image to be altered in appearance (e.g., multiple fiber optic filaments may be interleaved to form an icon representative of a transport key function and, when the appliance is performing the transport function, to cause an image positioned in proximity to the icon representative of the transport key function to become luminous to thereby display an indication of the active state of the appliance); causing an image to be made more prominent using a pattern (e.g., by strobing the source of illumination), etc. Various combinations of these methods for conveying information as part of graphical user interfaces may be utilized without limitation.

While the foregoing describes controlling devices 100 that use color or selective illumination (separately or together) to disseminate information, it is contemplated that other identification schemes (which may be used in addition to or in lieu of color) may be provided to similarly indicate relationships between function keys and appliances, the controlling device and user operational modes, and/or the controlling device and room operational modes. For example, information may be provided by controlling the tint, contrast, or brightness of displayed function keys and/or area(s) visually associated with function keys, a display face, etc. Still further, information may be provided by providing a visually identifiable pattern, shape, icon, or alphanumeric tag to a function keys and/or area(s) visually associated with function keys (e.g., imposing a crosshatch or other pattern on all function keys associated with a particular appliance, using commonly shaped function keys for an associated appliance, surrounding each function key with (or appending in super/subscript fashion) a shape or icon representing the associated device, appending an alphanumeric tag on or near a function key indicating the associated appliance, etc.).

While various concepts have been described in detail, it will be appreciated by those skilled in the art that various modifications and alternatives to those concepts could be developed in light of the overall teachings of the disclosure. For example, it should be appreciated that particularly where controlling devices utilizing multi-color and/or illuminable display screens are involved many combinations and variations of the above described function key association features are possible without departing from the spirit and scope of the present invention. For example the methods and techniques described herein may be combined with any or all of those described in co-pending U.S. patent application Ser. Nos. 10/664,629, 10/922,673 or 11/018,008, all of like assignee and all incorporated herein by reference in their entirety. Further, while the embodiments presented above generally use a touch sensitive key matrix overlaid on the display area as an input method, it will be appreciated that other methods for example hard keys arranged around the edges of a selectively illuminable display area are also possible. Additionally, while the embodiments presented above are described in the context of universal remote controls (i.e. controlling devices capable of commanding the operation of multiple classes of appliances devices from multiple manufacturers) as being most broadly representative of controlling devices in general, it will be appreciated that the teachings of this disclosure may be equally well applied to other controlling devices of narrower capability, and also to any general or specific purpose device requiring a visual interface (i.e. display screens, signage devices, teleprompters, etc) without departing from the spirit and scope of the present invention. Still further, it will be appreciated that the user interfaces described herein need not be limited to controlling devices but can be utilized in connection with any device having input elements wherein it is desired to convey information concerning such input elements. For example, the user interface may be utilized with devices such as calculators, phones, appliances, etc. having input elements having associated information conveying images in the form of alphanumeric and/or symbolic labels. As such, the particular concepts disclosed are meant to be illustrative only and not limiting as to the scope of the invention which is to be given the full breadth of the appended claims and any equivalents thereof.

All documents cited within this application for patent are hereby incorporated by reference in their entirety.

What is claimed is:

1. A user interface, comprising:

a plurality of input elements;

a source of light energy; and a fiber optic filament mat provided with irregularities with the irregularities provided to the fiber optic filament mat being arranged to form one or more visible iconic patterns when the fiber optic filament mat is illuminated by the source of light energy, the one or more visible iconic patterns being positioned relative to the plurality of input elements to convey information concerning the input elements.

2. The user interface as recited in claim 1, wherein the plurality of input elements comprises a touch sensitive surface having multiple actuation areas and the irregularities are arranged to form visible iconic patterns under the actuation areas of the touch sensitive surface.

3. The user interface as recited in claim 1, wherein the plurality of input elements comprises a plurality of hard keys and the irregularities are arranged to form visible iconic patterns adjacent to respective ones of the hard keys.

4. The user interface as recited in claim 1, wherein the irregularities are arranged to provide a visible association between sets of input elements in the plurality of input elements.

5. The user interface as recited in claim 1, wherein the source of light energy comprises an LED.

6. The user interface as recited in claim 1, wherein the source of light energy comprises multiple colors.

7. The user interface as recited in claim 6, wherein colors of the source of light energy are associated with operating modes of a device incorporating the user interface.

8. The user interface as recited in claim 1, wherein the visible iconic patterns comprise iconic representations of controllable device functions.

9. The user interface as recited in claim 1, comprising a plurality of fiber optic filament mats each provided with irregularities with the irregularities provided to each of the plurality fiber optic filament mats being arranged to form one or more visible iconic patterns when a respective one of the plurality of fiber optic filament mats is illuminated by the source of light energy, the one or more visible iconic patterns being positioned relative to the plurality of input elements to convey information concerning the input elements.

10. The user interface as recited in claim 9, wherein the plurality of fiber optic filament mats are arranged to allow for selective illumination of corresponding portions of the user interface.

11. The user interface as recited in claim 10, wherein the source of light energy comprises a plurality of LEDs each being associated with one of the plurality of fiber optic filament mats.

12. A controlling device, comprising:

a memory having a library of codes used to command functional operations of one or more appliances;

a transmission circuit for transmitting codes from the library of codes to the one or more appliances;

a plurality of input elements actuatable to cause the transmission circuit to transmit one or more codes from the library of codes to the one or more appliances;

a source of light energy; and a fiber optic filament mat provided with irregularities with the irregularities provided to the fiber optic filament mat being arranged to form one or more visible iconic patterns when the fiber optic filament mat is illuminated by the source of light energy, the one or more visible iconic patterns images being positioned relative to the plurality of input elements to convey information concerning the input elements.

13. The controlling device as recited in claim 12, wherein the plurality of input elements comprises a touch sensitive surface having multiple actuation areas and the irregularities are arranged to form visible iconic patterns under the actuation areas of the touch sensitive surface.

14. The controlling deviceas recited in claim 12, wherein the plurality of input elements comprises a plurality of hard keys and the irregularities are arranged to form visible iconic patterns adjacent to respective ones of the hard keys.

15. The controlling device as recited in claim 12, wherein the irregularities are arranged to provide a visible association between sets of input elements in the plurality of input elements.

16. The controlling device as recited in claim 12, wherein the source of light energy comprises an LED.

17. The controlling device as recited in claim 12, wherein the source of light energy comprises multiple colors.

18. The controlling device as recited in claim 17, wherein colors of the source of light energy are associated with operating modes of the controlling device.

19. The controlling device as recited in claim 17, wherein colors of the source of light energy are associated with intended target appliances for codes transmitted by the transmission circuit.

20. The controlling device as recited in claim 12, wherein the visible iconic patterns comprise iconic representations of controllable device functions.

21. The controlling device as recited in claim 12, comprising a plurality of fiber optic filament mats each provided with irregularities with the irregularities provided to each of the plurality of fiber optic filament mats being arranged to form one or more visible iconic patterns when a respective one of the plurality of fiber optic filament mats is illuminated by the source of light energy, the one or more visible iconic patterns being positioned relative to the plurality of input elements to convey information concerning the input elements.

22. The controlling device as recited in claim 21, wherein the plurality of fiber optic filament mats are arranged to allow for selective illumination of corresponding portions of a user interface incorporating the plurality of input elements.

23. The controlling device as recited in claim 22, wherein the source of light energy comprises a plurality of LEDs each being associated with one of the plurality of fiber optic filament mats.

24. A controlling device, comprising:

a memory having a library of codes used to command functional operations of one or more appliances;

a transmission circuit for transmitting codes from the library of codes to the one or more appliances;

a touch panel having a touch sensitive surface with multiple actuation areas wherein interaction with an actuation area causes the transmission circuit to transmit one or more codes from the library of codes to the one or more appliances;

a source of light energy; and a fiber optic filament mat disposed under the touch panel provided with irregularities with the irregularities provided to the fiber optic filament mat being arranged to form one or more visible iconic patterns under one or more of the multiple actuation areas of the touch sensitive surface when the fiber optic filament mat is illuminated by the source of light energy.

25. A method for making a user interface:

providing a fiber optic filament mat with irregularities with the irregularities provided to the fiber optic filament mat being arranged to form one or more visible iconic patterns when the fiber optic filament mat is illuminated by a source of light energy; and positioning the fiber optic filament mat relative to a plurality of input elements whereby the one or more visible iconic patterns function to convey information concerning the input elements.

26. The method as recited in claim 25, wherein the plurality of input elements comprises a touch sensitive surface having multiple actuation areas and the fiber optic filament mat is positioned such that the visible iconic patterns are disposed under the actuation areas of the touch sensitive surface.

27. The method as recited in claim 25, wherein the plurality of input elements comprises a plurality of hard keys and the fiber optic filament mat is positioned such that the visible iconic patterns are positioned adjacent to respective ones of the hard keys.

28. The method as recited in claim 25, wherein the irregularities are arranged to provide a visible association between sets of input elements in the plurality of input elements.

29. The method as recited in claim 25, wherein the source of light energy comprises an LED.

30. The method as recited in claim 25, wherein the source of light energy comprises multiple colors.

31. The method as recited in claim 30, wherein colors of the source of light energy are associated with operating modes of a device incorporating the user interface.

32. The method as recited in claim 25, wherein the visible iconic patterns comprise iconic representations of controllable device functions.

33. The method as recited in claim 25, wherein a plurality of fiber optic filament mats are each provided with irregularities with the irregularities provided to each of the plurality of fiber optic filament mats being arranged to form one or more visible iconic patterns when a respective one of the plurality of fiber optic filament mats is illuminated by the source of light energy and wherein the one or more visible iconic patterns are positioned relative to the plurality of input elements to convey information concerning the input elements.

34. The method as recited in claim 33, wherein the plurality of fiber optic filament mats are arranged to allow for selective illumination of corresponding portions of the user interface.

35. The method as recited in claim 34, wherein the source of light energy comprises a plurality of LEDs each being associated with one of the plurality of fiber optic filament mats.

36. A controlling device having a memory in which is stored a library of codes used to command functional operations of one or more appliances, a transmission circuit for transmitting codes from the library of codes to the one or more appliances, and a plurality of input elements actuatable to cause the transmission circuit to transmit one or more codes from the library of codes to the one or more appliances manufactured using a method comprising:

providing a fiber optic filament mat with irregularities with the irregularities provided to the fiber optic filament mat being arranged to form one or more visible iconic patterns when the fiber optic filament mat is illuminated by a source of light energy; and positioning the fiber optic filament mat relative to the plurality of input elements whereby the one or more visible iconic patterns function to convey information concerning the input elements.

37. The controlling device as recited in claim 36, wherein the plurality of input elements comprises a touch sensitive surface having multiple actuation areas and the fiber optic filament mat is positioned such that the visible iconic patterns are disposed under the actuation areas of the touch sensitive surface.

38. The controlling device as recited in claim 36, wherein the plurality of input elements comprises a plurality of hard keys, and the fiber optic filament mat is positioned such that the visible iconic patterns are positioned adjacent to respective ones of the hard keys.

39. The controlling device as recited in claim 36, wherein the irregularities are arranged to provide a visible association between sets of input elements in the plurality of input elements.

40. The controlling device as recited in claim 36, wherein the source of light energy comprises an LED.

41. The controlling device as recited in claim 36, wherein the source of light energy comprises multiple colors.

42. The controlling device as recited in claim 41, wherein colors of the sourcc of light energy are associated with operating modes of a device incorporating the user interface.

43. The controlling device as recited in claim 36, wherein the visible images comprise iconic representations of controllable device functions.

44. The controlling device as recited in claim 36, wherein a plurality of fiber optic filament mats are each provided with irregularities with the irreaularities provided to each of the plurality of fiber optic filament mats being arranged to form one or more visible iconic patterns when a respective one of the plurality of fiber optic filament mats is illuminated by the source of light energy and wherein the one or more visible iconic patterns are positioned relative to the plurality of input elements to convcy information concerning the input elements.

45. The controlling device as recited in claim 44, wherein the plurality of fiber optic filament mats are arranged to allow for selective illumination of corresponding portions of the user interface.

46. The controlling device as recited in claim 45, wherein the source of light energy comprises a plurality of LEDs each being associated with one of the plurality of fiber optic filament mats.

* * * * *